United States Patent [19]

Schemmann et al.

[11] Patent Number: 5,502,359
[45] Date of Patent: Mar. 26, 1996

[54] SMALL MOTOR WITH PERMANENT-MAGNET ROTOR

[75] Inventors: Hugo Schemmann, Schaesberg, Netherlands; Theo Hüsgen, Aachen, Germany

[73] Assignee: U.S. Philips Corporation, New York, N.Y.

[21] Appl. No.: 295,443

[22] Filed: Aug. 24, 1994

[30] Foreign Application Priority Data

Aug. 28, 1993 [DE] Germany ............................ 43 29 046.9

[51] Int. Cl.$^6$ ............................ H02K 7/00; H02K 1/00; H02K 3/14
[52] U.S. Cl. .................... 310/40 MM; 310/179; 310/184; 310/213
[58] Field of Search ............................ 310/40 MM, 179, 310/180, 184, 213

[56] References Cited

U.S. PATENT DOCUMENTS

| 3,333,172 | 7/1967 | Brailsford | 318/138 |
|---|---|---|---|
| 3,390,289 | 6/1968 | Dijken | 310/42 |
| 3,731,125 | 5/1973 | Nikaido et al. | 310/49 R |
| 4,135,107 | 1/1979 | Kamerbeek et al. | 310/179 |
| 4,200,817 | 4/1980 | Bratoljic | 310/198 |
| 4,238,702 | 12/1980 | Belova et al. | 310/179 |
| 4,500,824 | 2/1985 | Miller | 318/701 |
| 4,554,471 | 11/1985 | Bertram et al. | 310/49 R |
| 4,733,113 | 3/1988 | Smith | 310/49 R |
| 4,896,063 | 1/1990 | Roberts | 310/68 R |
| 5,231,324 | 7/1993 | Kawamura et al. | 310/198 |

OTHER PUBLICATIONS

"Feinwerktechnik and Messtechnik" 87 (1979) 4, pp. 163 to 169.

Primary Examiner—Thomas M. Dougherty
Assistant Examiner—Michael Wallace, Jr.
Attorney, Agent, or Firm—Edward Blocker; Bernard Franzblau

[57] ABSTRACT

A small motor having a two-pole permanent-magnet rotor and a U-shaped laminated stator having a pair of limbs with end portions that form magnetic poles for the rotor. The limbs carry alternately energized exciter coils including three nested winding layers arranged in two winding groups, of which the outer winding layer and the inner winding layer of the first limb and the second limb, respectively, and the central winding layer of the second limb and the first limb, respectively, are connected in series with one another.

8 Claims, 1 Drawing Sheet

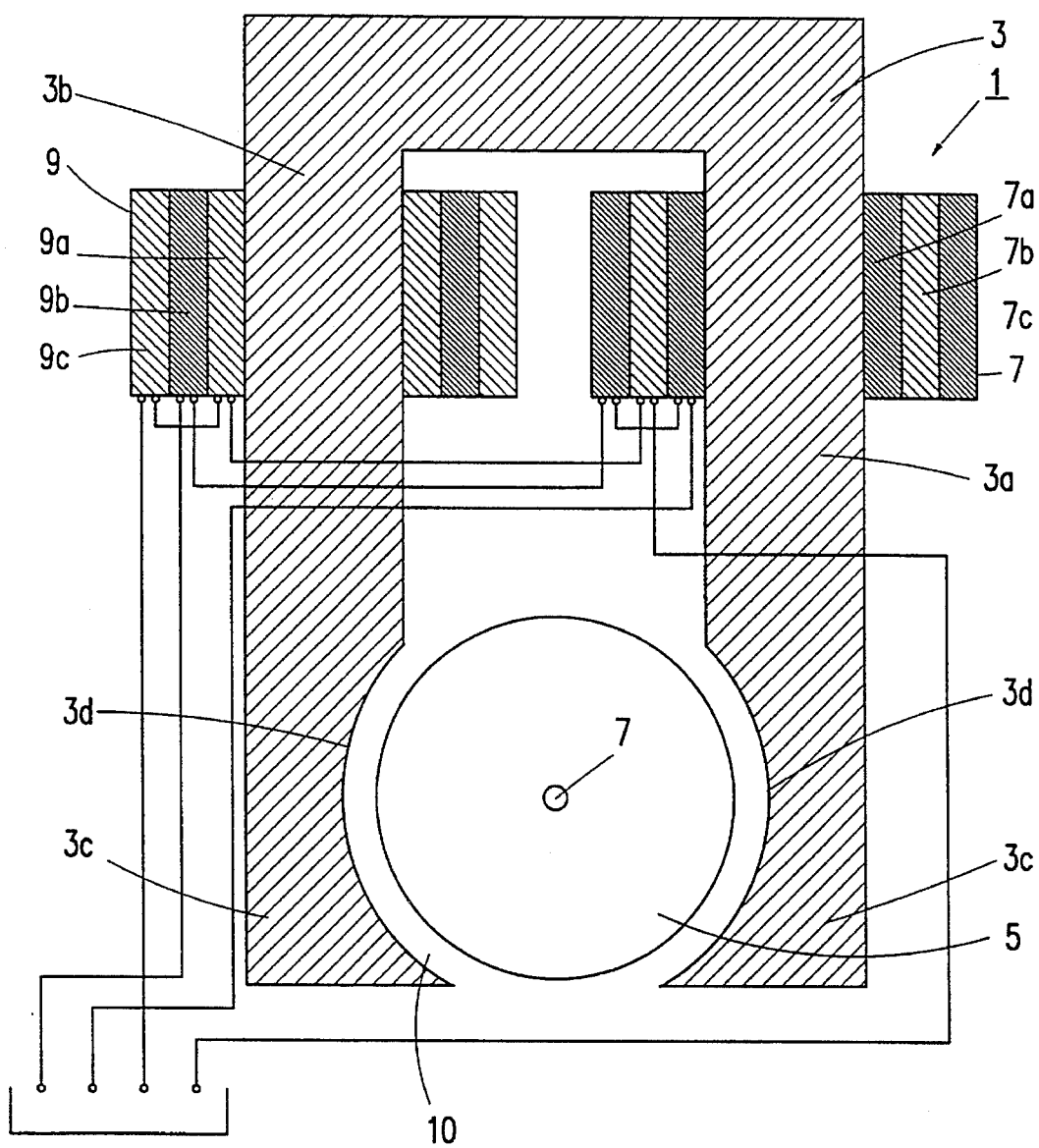

SMALL MOTOR WITH PERMANENT-MAGNET ROTOR

BACKGROUND OF THE INVENTION

This invention relates to a small motor having a permanent magnet rotor, in particular a two-pole permanent-magnet rotor, and a laminated stator, in particular a U-shaped stator, having limbs whose end portions form magnetic poles for the rotor, said limbs carrying exciter coils, in particular alternately energizable coils.

Small motors having permanent-magnet rotors feature a simple construction and, as a consequence, low manufacturing costs. As synchronous motors they are used particularly in the field of small domestic appliances. Such a small motor which is operated as a synchronous motor has been described in the magazine "Feinwerktechnik und Meβtechnik" 87 (1979) 4, pages 163 to 169.

In the case of position-dependent electronic control of these motors, they will behave in the same way as d.c. commutator motors. The maximum torque of such motors is limited by their size. Neither the maximum field to be generated nor the coil losses allow the motor torque to be increased for given dimensions. Therefore, the motor speed must be increased if it is required to increase their output power.

For the electronic control of these motors the winding is divided into two halves arranged on iron shanks, switching transistors alternately driving the coil halves so as to allow a reversal of the field direction in the air gap (U.S. Pat. No. 3,333,172). As a result of the leakage inductance switching voltages arise when switching from one winding to the other. By means of a special arrangement the voltage surges of these switching voltages can be limited to values which are safe for the switching transistors. However, apart from the required material and the associated costs, this method also gives rise to losses.

The use of bifilar windings enables the leakage inductance to be reduced so far that said special arrangement can be dispensed with. U.S. Pat. No. 4,500,824 describes such a bifilar winding.

However, in the case where position-controlled permanent-magnet motors are used the bifflar winding arrangement leads to winding capacitances, which are even stepped up by the required wiring. At higher speeds the winding then comes within the range of the resonant frequency. This leads to a resonance step-up of the winding resistance and, ultimately, to a torque reduction. As a result of this effect the motor torque decreases as the speed increases.

SUMMARY OF THE INVENTION

It is an object of the invention to provide a winding structure with a small leakage inductance in a small motor of the type defined in the opening paragraph, which structure shifts the resonant frequency well beyond the operating range.

According to the invention this object is achieved in that said exciter coils on both limbs comprise three nested winding layers in two winding groups, of which firstly an outer winding layer and secondly an inner winding layer of a first limb and a second limb, respectively, and thirdly a central winding layer of the second limb and the first limb, respectively, are connected in series with one another.

Such a winding structure provides a substantial reduction of the winding capacitance in comparison with the bifilar winding structure. The resonant frequency is shifted into a range fax outside the operating range of the motor. The leakage inductance remains so small that limiting of switching transients is not necessary.

In this way the maximum output power of the permanent-magnet motor is increased substantially. The advantages of the low-leakage winding are maintained.

BRIEF DESCRIPTION OF THE DRAWING

An embodiment of the invention will be described in more detail, by way of example, with reference to the drawing.

DESCRIPTION OF THE PREFERRED EMBODIMENTS

A small permanent-magnet motor 1 has a U-shaped laminated stator 3 with limbs 3a and 3b. At the location 3c of their ends the limbs 3a and 3b are constructed as magnetic poles 3d, in which a permanent-magnet rotor 5 is rotatable about a shaft 7, an air gap 10 being formed between the magnetic poles 3d and the rotor 5. This permanent-magnet rotor has a two-pole magnetisation.

The limbs 3a and 3b carry winding groups 7 and 9. Each of the two winding groups 7 and 9 comprises three nested winding layers 7a, 7b, 7c and 9a, 9b, 9c, respectively, the central layers having twice as many turns as the inner and the outer layers.

The winding layers are arranged in such a way that they are connected in series in accordance with a certain principle. Thus, the outer winding layer 9c of the first winding group 9, the inner winding layer 9a of the first winding group 9 and the central winding layer 7b of the second winding group 7 are connected in series with one another. Likewise, the central layer 9b of the first winding group 9, the outer winding layer 7c of the second winding group 7 and the inner winding layer 7a of the second winding group 7 are connected in series.

The energisation of the winding layers is effected in such a manner that the coils 9a, 7b, 9c produce augmenting fields in the limbs 3 and the coils 7a, 9b, 7c also produce augmenting fields in the limbs 3 in the opposite direction. Thus, the alternate energisation of the winding groups 9a, 7b, 9c and 7a, 9b, 7c produces an alternating field in the air gap 10, as is required for the rotary movement of the rotor 5.

As a result of the nesting of the active coil groups 9a, 7b, 9c and 7a, 9b, 7c on the two limbs 3a and 3b, the coupling of the two coil groups is satisfactory, while the winding capacitance is reduced in comparison with the bifilar winding, where the wires for the two coils are wound side by side.

This mitigates the undesirable influence of the winding capacitance on the torque and the losses, particularly at high speeds.

We claim:

1. A small motor comprising: a permanent-magnet rotor and a laminated stator having first and second limbs with end portions that form magnetic poles for the rotor, said limbs carrying exciter coils, wherein said exciter coils on both limbs in two winding groups, of which an outer winding layer and an inner winding layer of the first limb and the second limb, respectively, and a central winding layer of the second limb and the first limb, respectively, are connected in series with one another.

2. An electric motor comprising:

a U-shaped stator having first and second limbs with end portions that define a pair of spaced magnetic poles, a permanent magnet rotor mounted on a rotatable shaft and positioned within a space formed between said pair of magnetic poles, wherein said first and second stator limbs support exciter coils which comprise three nested winding layers on each limb and which include an inner winding layer, a central winding layer and an outer winding layer, said inner and outer winding layers on the first limb being connected in series circuit with the central winding on the second limb, and said inner and outer winding layers on the second limb being connected in series circuit with the central winding on the first limb.

3. The electric motor as claimed in claim 2 wherein said series circuit comprising said inner and outer winding layers on the first limb and the central winding layer on the second limb is connected to first and second voltage supply terminals for the electric motor, and said series circuit comprising said inner and outer winding layers on the second limb and the central winding layer on the first limb is connected to third and fourth voltage supply terminals for the electric motor.

4. The electric motor as claimed in claim 3 wherein said end portions of the stator limbs define a circularly symmetric space and said permanent magnet rotor has a continuous circular periphery.

5. The electric motor as claimed in claim 2 wherein each of the central winding layers has more turns than its associated inner and outer winding layers.

6. The electric motor as claimed in claim 2 wherein each of the central winding layers has twice as many turns as its associated inner and outer winding layers.

7. The electric motor as claimed in claim 3 wherein said supply voltage terminals are adapted to be coupled to a source of voltage so as to alternately energize winding groups on the first and second stator limbs so as to produce an alternating magnetic field in an air gap formed between the rotor and said pair of spaced magnetic poles.

8. The electric motor as claimed in claim 2 wherein said winding layers are non-bifilar windings and thereby provide a small leakage inductance and a lower winding capacitance compared to that of a bifilar winding.

* * * * *